(No Model.)
C. S. BLETON & A. MALEVILLE.
STAND OR CASING FOR BOTTLES.
No. 327,225. Patented Sept. 29, 1885.
Fig. 1    Fig. 2    Fig. 3
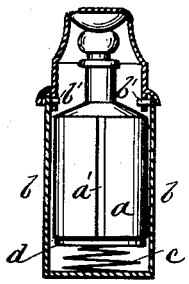  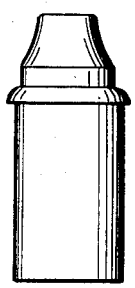
Fig. 4
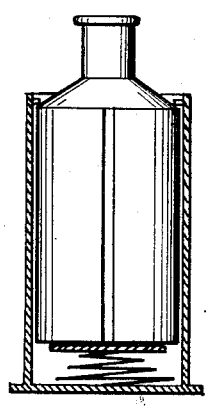  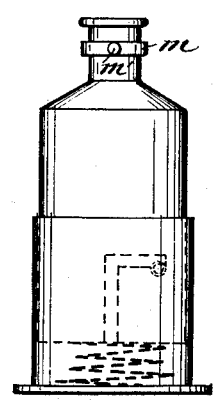
Fig. 5
Fig. 6
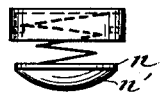
Fig. 7.
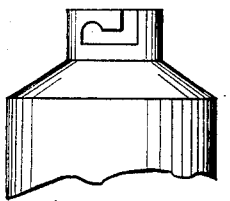
WITNESSES:
C. Neveux
C. Sedgwick
INVENTOR:
C. S. Bleton
A. Maleville
BY Munn &Co
ATTORNEYS.

UNITED STATES PATENT OFFICE.

CAMILLE SIMEON BLETON AND ADOLPHE MALEVILLE, OF PARIS, FRANCE.

STAND OR CASING FOR BOTTLES.

SPECIFICATION forming part of Letters Patent No. 327,225, dated September 29, 1885.

Application filed September 24, 1884. (No model.) Patented in France August 25, 1881, No. 144,537, and in England March 18, 1882, No 1,333.

*To all whom it may concern:*

Be it known that we, CAMILLE SIMEON BLETON and ADOLPHE MALEVILLE, residing at Paris, in the Department of the Seine, Republic of France, have invented certain new and useful Improvements in Stands or Casings for Bottles and other Articles of Glass, Porcelains, &c., (for which we have received Letters Patent in France, dated August 25, 1881, No. 144,537, and in Great Britain, dated March 18, 1882, No. 1,333;) and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention consists in the combination of parts, including their construction, substantially as hereinafter fully set forth, and pointed out in the claims.

In order that our improvements may be fully understood, we have illustrated a number of examples thereof on the accompanying drawings, in which—

Figure 1 represents a vertical section of a pocket-bottle inclosed in a casing closed by a cover. Fig. 2 shows an elevation of a bottle removed from its casing. Fig. 3 represents an elevation of the casing inclosing the bottle. Fig. 4 is a vertical section of a stand or casing provided with a spring and inclosing the bottle with a rectilinear groove in its side. Fig. 5 is an elevation of a stand or casing provided with a spring and carrying a bottle having a bent or bayonet-shaped groove with a safety-notch and a spring-cover secured to it. Fig. 6 shows a stoppering-cap. Fig. 7 is the neck of a glass bottle having bayonet-shaped grooves molded in it.

In Fig. 1 a bottle, $a$, provided with vertical grooves $a'$, is supposed to be inclosed in a casing, $b$, carrying two tenons, $b'$ $b'$.

In the bottom of the case we provide a spiral or other suitable spring, $c$, soldered upon a disk, $d$, supporting bottle $a$. The figure only shows one such groove $a'$. The other is placed on the back side in the same vertical plane, taken through the center of the bottle. When it is desired to insert bottle $a$ into its case or stand $b$, it is first placed so as to engage tenons $b'$ $b'$ into grooves $a'$. Then the bottle is forced down by compressing spring $c$ until tenons $b'$ $b'$ pass beyond the upper edge of the body of bottle $a$. The latter is then turned by about a quarter of a revolution. Thus, grooves $a'$ being no longer below tenons $b'$, the bottle will be retained in its stand.

In Figs. 1 and 3 we have shown a cover which is designed to be provided with bayonet-shaped grooves with a safety bend or notch similar to those provided in the cover shown in Fig. 5, and intended to receive tenons $b'$.

Instead of rectilinear vertical grooves $a'$, the bottle may be provided with bent or bayonet-shaped grooves $a''$ $a'''$, (see Fig. 2,) grooves $a'$ extending up to the top of the bottle or terminating on a level with horizontal grooves $a''$ $a''$. The latter are provided with safety-notches, in which tenons $b'$ $b'$ arranged somewhat lower in the casing are to engage. This arrangement is shown in Fig. 5, in which we have represented a casing covering only the lower part of a toilet-bottle.

In the foregoing description we have supposed our improvements to apply chiefly to bottles. The same devices are, however, applicable as well to all other articles manufactured of glass, porcelain, and similar material, and intended to be inclosed in or protected by a casing.

Having thus described our invention, we claim as new and desire to secure by Letters Patent—

1. The combination, with the bottle having longitudinal grooves in opposite sides, of the casing having inwardly-projecting studs or tenons and the cap having grooves engaging said studs or tenons, substantially as and for the purpose set forth.

2. A metal casing or stand provided with inwardly-projecting tenons, in combination with the bottle having longitudinal grooves in opposite sides, substantially as herein shown and described.

3. A stand or casing having inwardly-projecting tenons and provided at the bottom with a spring-cushion, in combination with the bottle having longitudinal grooves in opposite sides, substantially as herein shown and described.

In testimony whereof we affix our signatures in presence of two witnesses.

CAMILLE SIMEON BLETON.
ADOLPHE MALEVILLE.

Witnesses:
FRÉDÉRIC JOUBERT,
ROBT. M. HOOPER.